US007162220B2

(12) United States Patent
Hanson

(10) Patent No.: US 7,162,220 B2
(45) Date of Patent: *Jan. 9, 2007

(54) PREPAY TELECOMMUNICATIONS SYSTEM

(75) Inventor: Daniel A. Hanson, Dallas, TX (US)

(73) Assignee: Verisign, Inc., Mountain View, CA (US)

( * ) Notice: Subject to any disclaimer, the term of this patent is extended or adjusted under 35 U.S.C. 154(b) by 552 days.

This patent is subject to a terminal disclaimer.

(21) Appl. No.: 10/612,981

(22) Filed: Jul. 7, 2003

(65) Prior Publication Data
US 2004/0098293 A1 May 20, 2004

Related U.S. Application Data

(63) Continuation of application No. 09/793,064, filed on Feb. 26, 2001, now Pat. No. 6,625,438, which is a continuation of application No. 09/399,915, filed on Sep. 21, 1999, now Pat. No. 6,208,851, which is a continuation of application No. 08/794,463, filed on Feb. 4, 1997, now Pat. No. 6,058,300.

(51) Int. Cl.
*H04Q 7/38* (2006.01)
(52) U.S. Cl. .................. 455/405; 455/408; 455/432.1
(58) Field of Classification Search ........ 455/405–408, 455/414.1, 422.1, 424, 432.1, 432.3, 435.1, 455/445; 379/114.01, 114.2
See application file for complete search history.

(56) References Cited

U.S. PATENT DOCUMENTS

| | | | |
|---|---|---|---|
| 4,233,473 A | 11/1980 | Frost | |
| 4,706,275 A | 11/1987 | Kamil | 379/144 |
| 4,930,150 A | 5/1990 | Katz | 379/93 |
| 5,063,591 A | 11/1991 | Lodoin | |
| 5,220,593 A * | 6/1993 | Zicker et al. | 379/145 |
| 5,291,543 A * | 3/1994 | Freese et al. | 455/408 |
| 5,325,418 A * | 6/1994 | McGregor et al. | 379/59 |

(Continued)

FOREIGN PATENT DOCUMENTS

DE 44 19 651 A1 12/1995

(Continued)

OTHER PUBLICATIONS

Luna, Lynnette, "National Telemanagement Answer Prepaid Wireless Dilemmas", *RCA The Weekly Newspaper for the Wireless Industry*, Dec. 16, 1996.

(Continued)

*Primary Examiner*—Binh K. Tieu
(74) *Attorney, Agent, or Firm*—Kenyon & Kenyon LLP

(57) ABSTRACT

The prepay telecommunications system (60) includes a prepay call, management, platform (50) which is directly coupled to a telecommunications carrier switch (24). A customer database (116) is coupled to the prepay call management platform (50) for storing prepay customer data, and a plurality of customer interface facilities (62, 64, 66, 68, 80) are provided for accepting customer prepayment and immediately updating the customer database (116). The prepay calls are recognized by the mobile identification number and is routed to the prepay call management platform (50) coupled to and co-located with the telecommunications carrier switch (24). The customer account balance associated with the prepay call is looked up in a customer database (116), and the maximum allowable call duration in response to the customer account balance is computed. The prepay call is then released to the telecommunications carrier switch (24) for line termination. At the same time, a call duration timer is started. The call is disconnected in response to the call duration timer reaching the maximum allowable call duration. The prepay telecommunications system is applicable to both wireless and non-wireless telecommunications systems.

33 Claims, 4 Drawing Sheets

U.S. PATENT DOCUMENTS

| | | | |
|---|---|---|---|
| 5,345,498 A | 9/1994 | Mauger | 455/406 |
| 5,353,335 A | 10/1994 | D'Urso et al. | 379/67 |
| 5,412,726 A | 5/1995 | Nevoux et al. | 380/24 |
| 5,438,615 A | 8/1995 | Moen | 379/14 |
| 5,440,108 A | 8/1995 | Tran et al. | 235/381 |
| 5,440,621 A * | 8/1995 | Castro | 379/112 |
| 5,450,938 A | 9/1995 | Rademacher | 194/206 |
| 5,497,412 A | 3/1996 | Lannen et al. | |
| 5,500,514 A | 3/1996 | Veeneman et al. | 235/381 |
| 5,546,446 A | 8/1996 | Tsunokawa et al. | 379/114 |
| 5,577,100 A * | 11/1996 | McGregor et al. | 379/58 |
| 5,577,109 A | 11/1996 | Stimson et al. | 379/112 |
| 5,583,918 A * | 12/1996 | Nakagawa | 379/144 |
| 5,592,535 A * | 1/1997 | Klotz | 455/408 |
| 5,621,787 A * | 4/1997 | McKoy et al. | 379/144 |
| 5,621,796 A | 4/1997 | Davis et al. | 380/24 |
| 5,719,926 A | 2/1998 | Hill | 379/113 |
| 5,721,768 A * | 2/1998 | Stimson et al. | 379/114 |
| 5,722,067 A * | 2/1998 | Fougnies et al. | 455/406 |
| 5,732,136 A | 3/1998 | Murphree et al. | 380/24 |
| 5,778,313 A | 7/1998 | Fougnies | 455/406 |
| 5,796,790 A | 8/1998 | Brunner | |
| 5,826,185 A * | 10/1998 | Wise et al. | 455/405 |
| 5,850,599 A | 12/1998 | Seiderman | 455/406 |
| 5,854,975 A | 12/1998 | Fougnies et al. | |
| 5,862,471 A | 1/1999 | Tiedemann, Jr. et al. | |
| 5,867,566 A * | 2/1999 | Hogan et al. | 379/115 |
| 5,873,034 A * | 2/1999 | Alperovich et al. | 455/432 |
| 5,875,238 A | 2/1999 | Glitho et al. | |
| 5,995,831 A * | 11/1999 | Gulliford et al. | 455/426 |
| 6,018,652 A * | 1/2000 | Frager et al. | 455/406 |
| 6,023,618 A * | 2/2000 | Janhonen et al. | 455/406 |
| 6,026,291 A * | 2/2000 | Carlsson et al. | 455/406 |
| 6,029,062 A * | 2/2000 | Hanson | 455/406 |
| 6,035,025 A * | 3/2000 | Hanson | 379/144 |
| 6,036,090 A * | 3/2000 | Rahman et al. | 235/380 |
| 6,058,300 A | 5/2000 | Hanson | |
| 6,101,378 A * | 8/2000 | Barabash et al. | 455/406 |
| 6,101,379 A * | 8/2000 | Rahman et al. | 455/406 |
| 6,208,851 B1 | 3/2001 | Hanson | |

FOREIGN PATENT DOCUMENTS

| | | |
|---|---|---|
| DE | 4419651 | 12/1995 |
| EP | 0 698 987 A2 | 2/1996 |
| EP | PT0698987 | 2/1996 |
| WO | WO 95/28062 | 10/1995 |
| WO | WO95/28062 | 10/1995 |
| WO | WO 95/34161 | 12/1995 |
| WO | WO95/34161 | 12/1995 |
| WO | WO 96/15633 | 5/1996 |
| WO | WO96/15633 | 5/1996 |
| WO | WO 96/36192 | 11/1996 |

OTHER PUBLICATIONS

"Automatic Prepaid Roaming Using the NTC Network", released by National Telemanagement Corporation.

"Other Prepaid Billing Systems Could Match Ours. But They'd Have to Clone Our Number.", Advertisement released by Subscriber Computer, Inc.

Freeman, Susan, "Are Prepaid Applications 'On The Fringe' or Infringing?", Intele-Card News, pp. 32-36, Jan./Feb. 1996.

Luna, Lynnette, "National Telemanagement answers prepaid wireless dilemmas", *RCR The Weekly Newspaper for the Wireless Industry*, Dec. 16, 1996.

"Automatic Prepaid Roaming Using the NTC Network", released by National Telemanagement Corporation.

"Other prepaid billing systems could match ours. But they'd have to clone our number.", Advertisement released by Subscriber Computer, Inc.

Freeman, Susan, "Arc prepaid applications "on the fringe" or infringing?", Intele-Card News, Jan./Feb. 1996, pp. 32-36.

* cited by examiner

PREPAY TELECOMMUNICATIONS SYSTEM

CROSS REFERENCE TO RELATED APPLICATIONS

This application is a continuation of U.S. patent application Ser. No. 09/793,064, filed Feb. 26, 2001 now U.S. Pat. No. 6,625,438, which is a continuation of U.S. patent application Ser. No. 09/399,915, filed Sep. 21, 1999, now U.S. Pat. No. 6,208,851 (issued Mar. 27, 2001), which is a continuation of U.S. patent application Ser. No. 08/794,463, filed Feb. 4, 1997, now U.S. Pat. No. 6,058,300 (issued May 2, 2000).

BACKGROUND OF THE INVENTION

The world of wireless telecommunications is entering a new era with the advent of personal communications services (PCS). The constant trend toward lower and lower subscriber acquisition costs and higher market penetration is creating a demand for more effective ways to offer the wireless service to broader segments of the population. However, a large percentage of applicants are normally turned away from wireless carriers due to poor or insufficient credit, although many of these applicants do possess the ability to pay for the service. Accordingly, a growing segment within the wireless telecommunications market is the prepaid wireless service.

The typical wireless service requires its subscriber caller to deposit a certain amount of funds, by cash, credit card, and/or other means, into an account. As the caller uses the wireless service, the account balance is deducted. As long as there are funds in the account, the caller may continue to use the wireless service. Additional deposits may be made to replenish the account balance.

There are however, several disadvantages associated with traditional prepaid wireless accounts. First, the caller may be required to enter an additional authorization code or personal identification number (PIN) in order to place each call. Some debit cards or debit systems may require the customer to enter as many as 31 additional digits. Second, the traditional prepaid wireless services lack the ability to disconnect a call during the call when the account balance is fully depleted. Third, there is substantial lag time between the time of the call and the time the amount of funds expended by a call is posted to the account. Therefore, it may be seen that the wireless service provider experiences credit exposure with post call billing and the inability to disconnect calls as soon as the accounts are depleted of funds. While these problems are most acute in the wireless industry, they are also a problem in other telecommunications systems.

SUMMARY OF THE INVENTION

Accordingly, there is a need for a prepay telecommunications system that is transparent to its user except to pay in advance for the services. Further, there is a need to be able to monitor the call in real-time in order to disconnect calls as soon as funds are depleted in the account.

In accordance with the present invention, a prepay telecommunications system with live call management is provided which eliminates or substantially reduces the disadvantages associated with prior prepay services.

In one aspect of the invention, a prepay telecommunications system includes a prepay call management platform which is directly coupled and co-located with a telecommunications carrier switch. The system further includes a customer database coupled to the prepay call, management platform for storing prepay customer data.

In another aspect of the invention, a prepay telecommunications system includes a, prepay call management platform which is directly coupled, and co-located with a telecommunications carrier switch, and a customer database coupled to the prepay call management platform for storing prepay customer data. Further provided is a plurality of customer interface facilities for accepting customer prepayment and immediately updating the customer database.

In yet another aspect of the invention, a method for live call management of a prepay call includes the steps of recognizing a prepay call at a telecommunications carrier switch, and routing, the prepay call to a prepay call management platform coupled to and co-located with the telecommunications carrier switch. The customer account balance associated with the prepay call is looked up in a customer data database, and the maximum allowable call duration in response to the customer account balance is computed. The prepay call is then released to the telecommunications carrier switch for line termination. At the same time, a call duration timer is started. The call is disconnected in response to the call duration timer reaching the maximum allowable call duration.

In yet another aspect of the invention, a method for live call management of a prepay call includes the steps of recognizing a roaming call at a telecommunications carrier switch, routing the roaming call to a roaming platform coupled to the telecommunications carrier switch, and recognizing the roaming call being associated with a prepay account at a home prepay call management platform. The customer account balance associated with the roaming call is looked up in a customer data database coupled to the home prepay call management platform and the maximum allowable call duration in response to the customer account balance is determined. The call is then released to the roaming platform, which in turn releases it to the telecommunications carrier switch for line termination. A call duration timer is started and the call is disconnected in response to the call duration timer reaching the maximum allowable call duration.

A technical advantage of the prepay wireless telecommunications system of the present invention is the ease of use, since callers do not need to remember or dial any authorization codes or personal identification numbers. Further, customer accounts are immediately updated to reflect any replenishing transactions or funds expended by calls. Most importantly, by offering the prepay services of the present invention, the telecommunications carrier does not experience unnecessary credit exposure due to depleted funds or fraud.

BRIEF DESCRIPTION OF THE DRAWINGS

For a better understanding of the present invention, reference may be made to the accompanying drawings, in which.

DETAILED DESCRIPTION OF THE INVENTION

Figure 1:
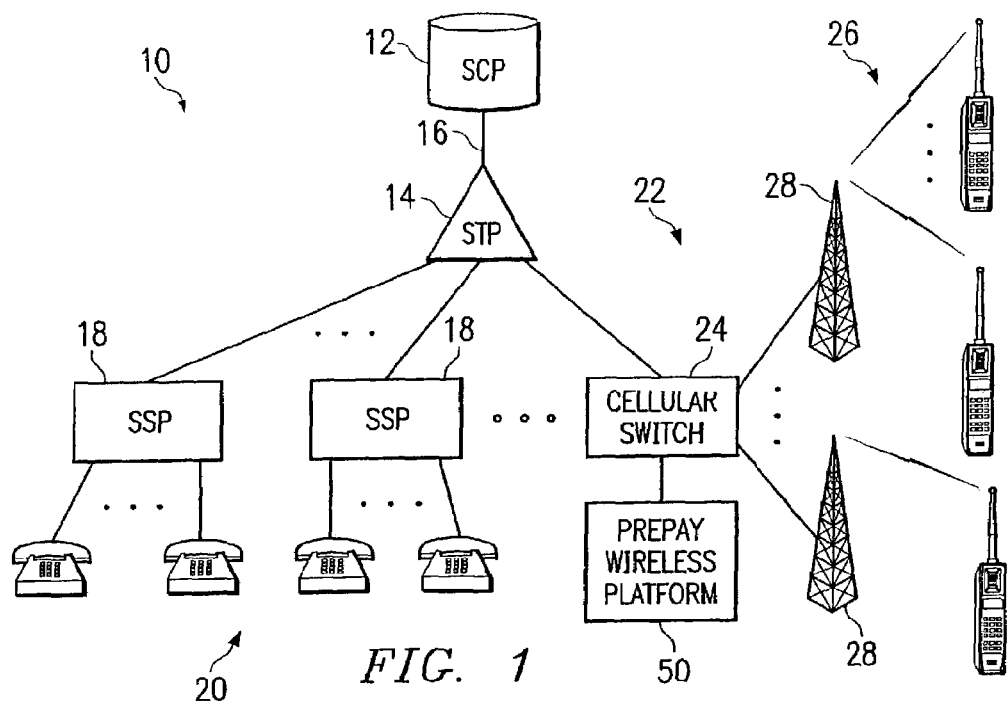
FIG. 1 is a block diagram of an exemplary telecommunications network according to the teachings of the present invention.

The preferred embodiment(s) of the present invention is (are) illustrated in FIGS. 1–5, like reference numerals being used to refer to like and corresponding parts of the various drawings.

Referring to FIG. 1, a block diagram of an exemplary, telecommunications network 10 according to the teachings of the present invention is shown. Telecommunications network is preferably constructed pursuant to the Advanced Intelligent Network (AIN) architecture 10. Telecommunications network, 10 includes, a service control point (SCP) 12 coupled to a signal transfer point (STP) 14 through a signaling system no. 7 (SS7) link set 16 specified by the Consultative Committee on International Telephone and Telegraph (CCITT) An SS7 link set, may include up to sixteen 56 Kb/s links. STP 14 is in turn coupled to one or more service switching points (SSP) 18 also via SS7 link sets. SSPs 18 connect telephone service customers 20 to the telecommunications network.

A wireless telephone system 22 is further coupled to STP 14 to provide wireless telecommunications services to wireless service customers 26. Wireless telephone system 22 may include a wireless or cellular switch residing in a mobile telecommunications, switching office (MTSO) 24. Wireless telephone system 22 encompassing one or more MTSO 24 may include a number of land-based transmission towers 28 and/or satellite-based wireless transponders (not shown). Calls may originate from a non-wireless telephone customer 20 to another non-wireless telephone customer 20, from a wireless telephone customer 26 to another wireless telephone customer 26, from a non-wireless telephone customer 20 to a wireless telephone customer 26, and vice versa. According to the teachings of the present invention, a prepay wireless platform 50 is coupled to cellular switch 24 to provide live call management therefor. Prepay wireless platform 50 may also be hereinafter referred to as a prepay call management platform 50. Preferably, prepay wireless platform 50 is co-located with cellular switch 24 or located on-site with cellular switch 24. The communications span between cellular switch 24 and prepay wireless platform 50 may be a T1 line, an SS7 link set, or any other suitable medium according to any other suitable communications protocol.

It is important to note that prepay call management platform 50 may also be coupled to SSP 18 to provide prepay live call management to non-wireless telecommunications systems in a similar manner. Although the detailed description below is directed toward applications to a wireless telecommunications system, the discussion is equally applicable to a non-wireless telecommunications system.

Figure 2:
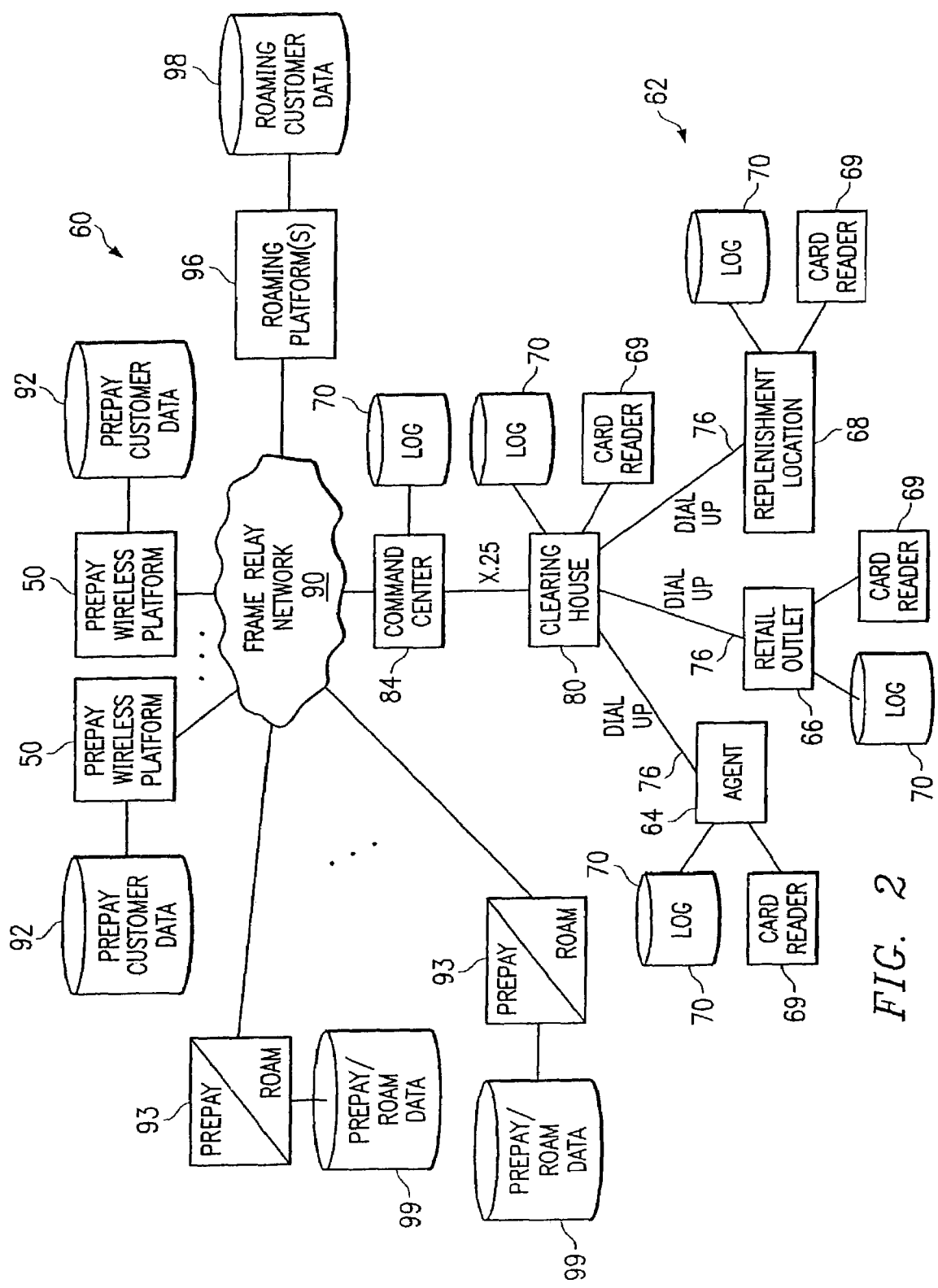
FIG. 2 is a block diagram of an exemplary prepay wireless telecommunications architecture according, to the teachings of the present invention.

FIG. 2 is a block diagram of an exemplary prepay wireless telecommunications architecture 60 according to the teachings of, the present invention. A number of customer interface facilities 62, such as authorized sales agents 64, retail outlets 66, and replenishing locations 68 are employed to provide a network of convenient access points to the customers. Card readers 69 may be employed at customer interface facilities 62 to read customer data stored in a deposit card issued to each prepay customer. A log 70 of customer information is kept at each respective customer interface facility 62 to record the customer names, account numbers, and the transaction amounts. The customers may activate prepay wireless service and replenish their accounts at any of these customer interface facilities 62. Further, customer interface facilities 62 may also include a clearinghouse network 80 which includes a large number of nationwide or global retail locations, such as the Travelers Express™, that may also be used to replenish prepay wireless accounts. Clearinghouse 80 may further maintain a log 70 of its customer information. Authorized sales agents 64, retail outlets 66, and replenishing locations 68 may have dial-up connections to clearinghouse network 80, which may be coupled to a command center 84 through a packet switching X.25 span specified by the CCITT, for example.

Clearinghouse 80 may further be coupled to an optional command center 84 via an X.25 link, for example., Command center 84 may serve to oversee the operations of prepay wireless telecommunications service and as an interface between customer interface units 62 and clearinghouse 80 to prepay wireless platforms 50. A log 70 of customer information may also be maintained at command center 84.

Command center 84 preferably communicates with one or more prepay wireless platforms 50 via a frame relay network 90. Each wireless platform 50 maintains a database 92 of its customers. Prepay wireless platforms 50 may further communicate with one another and to one or more roaming platforms 96 via frame relay network 90. Each roaming platform 96 preferably maintains a roaming customer database 98. At other sites or cities, co-located prepay and roam wireless platforms 93 may serve the local wireless subscriber community. Databases 99 storing customer data related to prepay accounts and roaming capabilities are coupled to each prepay/roam platform, 93. Prepay/roam platforms 93 may communicate with one another and with prepay wireless platforms 50 and roaming platforms 96 via frame relay network 90. As each customer activates a prepay wireless account, he/she is assigned a primary or home prepay wireless platform 50, where data associated with the customer's prepay account is stored.

In operation, cash, bank drafts, credit cards, and telephone company billing may be used to replenish the prepay wireless account at any customer interface facility 62. A deposit card (not shown) which has a magnetic strip, embedded chip, or another storage medium, recording the customer's name and account number may be issued to each customer. Customer interface facilities 62 preferably, employ data card readers 69 to obtain the information stored in the customer's deposit card and to immediately relay this information and the transaction amount to the customer's home prepay wireless platform 50. The transaction amount is then immediately posted to the customer's account, to reflect the new balance. This transaction is similar to a credit card or debit card transaction at a point of sale (POS). If authorized, the customer may also dial a pre-assigned code with the wireless telephone to replenish his/her account with a credit card. Constructed in this manner, the customer may immediately begin to use the wireless services.

Figure 3:
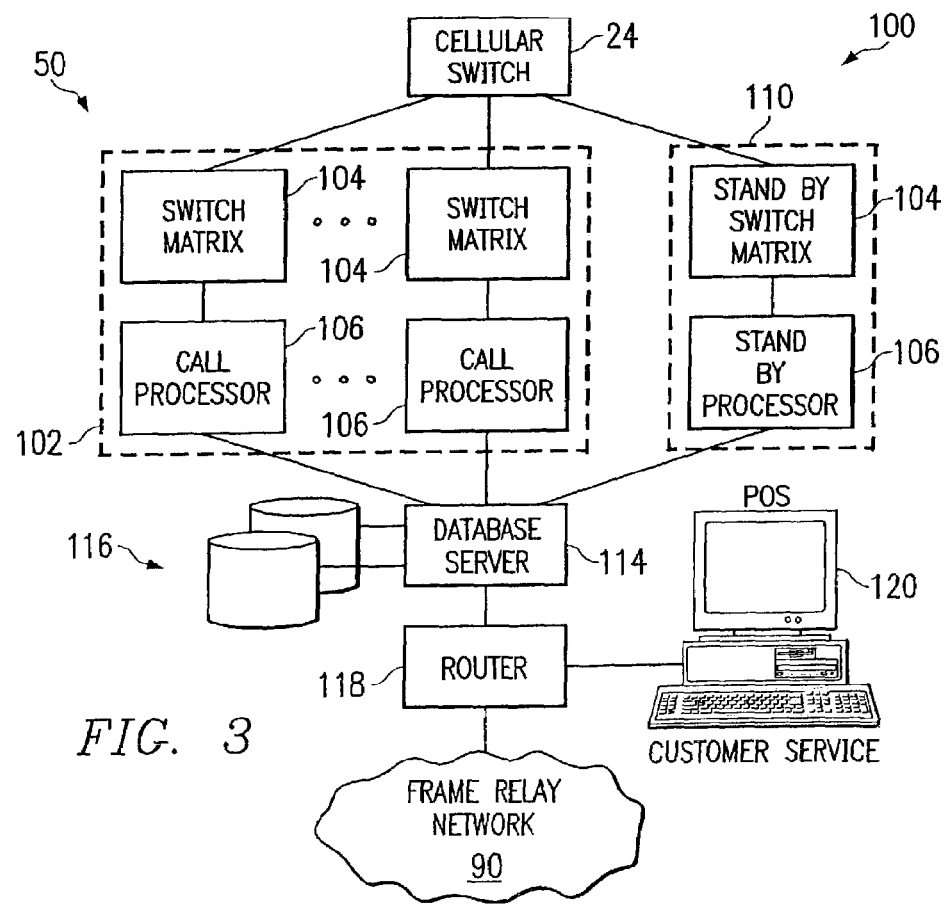
FIG. 3 is a block diagram of an exemplary prepay wireless platform according to the teachings of the present invention.

FIG. 3 is a block diagram of an exemplary prepay wireless platform 50 according to, the teachings of the present invention. Prepay wireless platform 50 includes a primary call manager unit 102 and an optional backup call manager unit 110. Primary call manager unit. 102 may include one or more switch matrices 104, each being coupled to a respective call processor 106. Call processors 106 provide voice prompts and announcements, account balance computations, call progress monitoring and call blocking. Automatic voice announcements may be programmed to provide the customer the remaining balance in the prepay account at the beginning of a call and reminders to replenish accounts prior to call termination when a preset minimum is reached. If desired, multi-lingual voice announcements may be configured to meet the customer's preference.

Backup call manager 110 may be similarly constructed with one or more standby switch matrices 104 and a standby processor 106. The number of standby switch matrices and standby call processors is dependent on the level of redundancy required, which may be 1:1, 2:1, 3:1, etc. Switch matrices 104 may be implemented with Nortel™ Meridian™ switches and other switches of similar operational characteristics and functionality.

It may be seen that primary and standby call manager units 102 and 110 may be implemented by only a computing processor if prepay wireless platform 50 is more highly integrated with the carrier's switch 24, so that the functionality of switch matrix 104 is carried out thereby.

Primary and standby call manager units 102 and 110 are preferably co-located with cellular switch 24 and are coupled thereto via a T1, SS7, or any other suitable link. Call processors 106 are further coupled to a database server 114, which maintains a pair of mirrored databases 116 to provide redundancy and ensure the integrity of the data. Database server 114 and call processors 106 may be implemented by any processor unit with adequate processing capacity and speed, and may be a personal computer, a workstation, a mini-computer, or the like. Database server 114 is further coupled to a router 118 which-provides data and message routing functions between prepay wireless platform 50 and customer service/system administration/POS terminals 120 via a local area network (LAN), and to customer interface facilities 62 (FIG. 2) via frame relay network 90.

In operation, prepay wireless platform 50 may accept dual-tone multifrequency (DTMF), multifrequency (MF), or primate rate addressing protocols from cellular switch 24. When cellular switch 24 recognizes a prepay wireless customer by the mobile identification number (MIN), cellular switch 24 transfers the call to prepay wireless platform 50 for account balance verification, individual account processing requests, and then routes the call back to the cellular carrier for call completion. However, if there is insufficient funds in the caller's account, the call is not completed except calls for emergency 911 or customer service, for example. If a caller's account balance is exhausted while in the middle of a call, the call is disconnected immediately.

Because prepay wireless platform 50 is directly coupled to the cellular carrier's switch and resides in close proximately or on-site with the cellular switch, local, calls stay within the carrier's network. Further, customer data is readily accessible by the cellular switch's personnel via a LAN connection or a local dial-up protocol. More importantly, live in-call management is possible to avoid unnecessary credit exposure.

Figure 4:
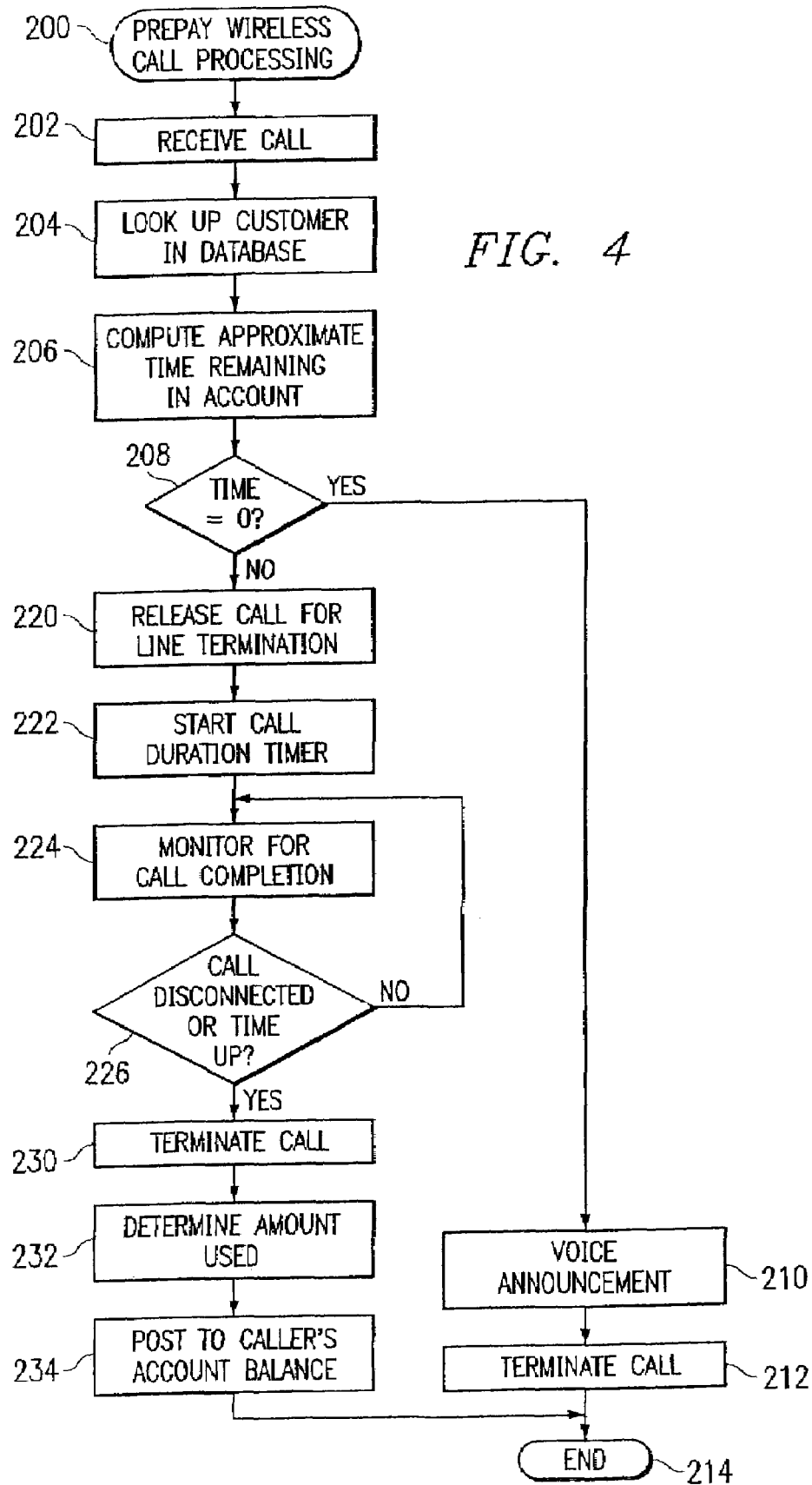
FIG. 4 is a flowchart of an exemplary prepay wireless call processing procedure according to the teachings of the present invention.

FIG. 4 is a flowchart of an exemplary prepay wireless call processing procedure 200 according to the teachings of the present invention. Referring also to FIG. 3, switch matrix 104 of prepay wireless platform 50 receives a call from cellular switch 24, as shown in block 202. Cellular switch 24 recognizes a prepay wireless call by the MIN, or more specifically, by the customer group office code (NPA-NXX). Prepay wireless customers may be assigned customer group office codes within a predetermined range for ease of recognition.

Upon receiving a call, a database lookup of database 116 is performed to locate the data related to the prepay wireless customer, such as the account balance, as shown in block 204. Call processor 106 then determines the rate per minute the present call is to be charged, which is dependent on whether the call is local or long distance, or the access and air time fees and applicable taxes, etc. From the rate per minute, the amount of time available for the call is computed based on the amount of funds available in the customer's account, as shown in block 206. This computed amount, in number of minutes, for example, is the maximum allowable call duration. If the time is zero, as determined in block 208, then a voice announcement is played by call processor 106 to inform the customer, and the call is disconnected, as shown in blocks 210 and 212. The process then terminates 214.

If, on the other hand, there are sufficient funds left in the account to connect the call, the call is released back to cellular switch 24 for line termination, as shown in block 220. Once the call is released to cellular switch 24, call processor 106 starts a call duration timer, as shown in block 222. Call processor, 106 further monitors the call for hardware answer supervision that indicates call completion, as shown in block 224. The call is torn down and disconnected when either of two conditions shown in block 226 becomes true:

1. The call is disconnected at the originating or terminating equipment; or
2. The call duration timer has reached the computed maximum allowable call duration.

As soon as one of the above conditions is true, the call is disconnected, as shown in block 230. The amount of funds expended by the call is then computed and immediately posted to the customer's account balance stored in databases 116, as shown in blocks 232 and 234. The process then terminates in block 214.

Figure 5:
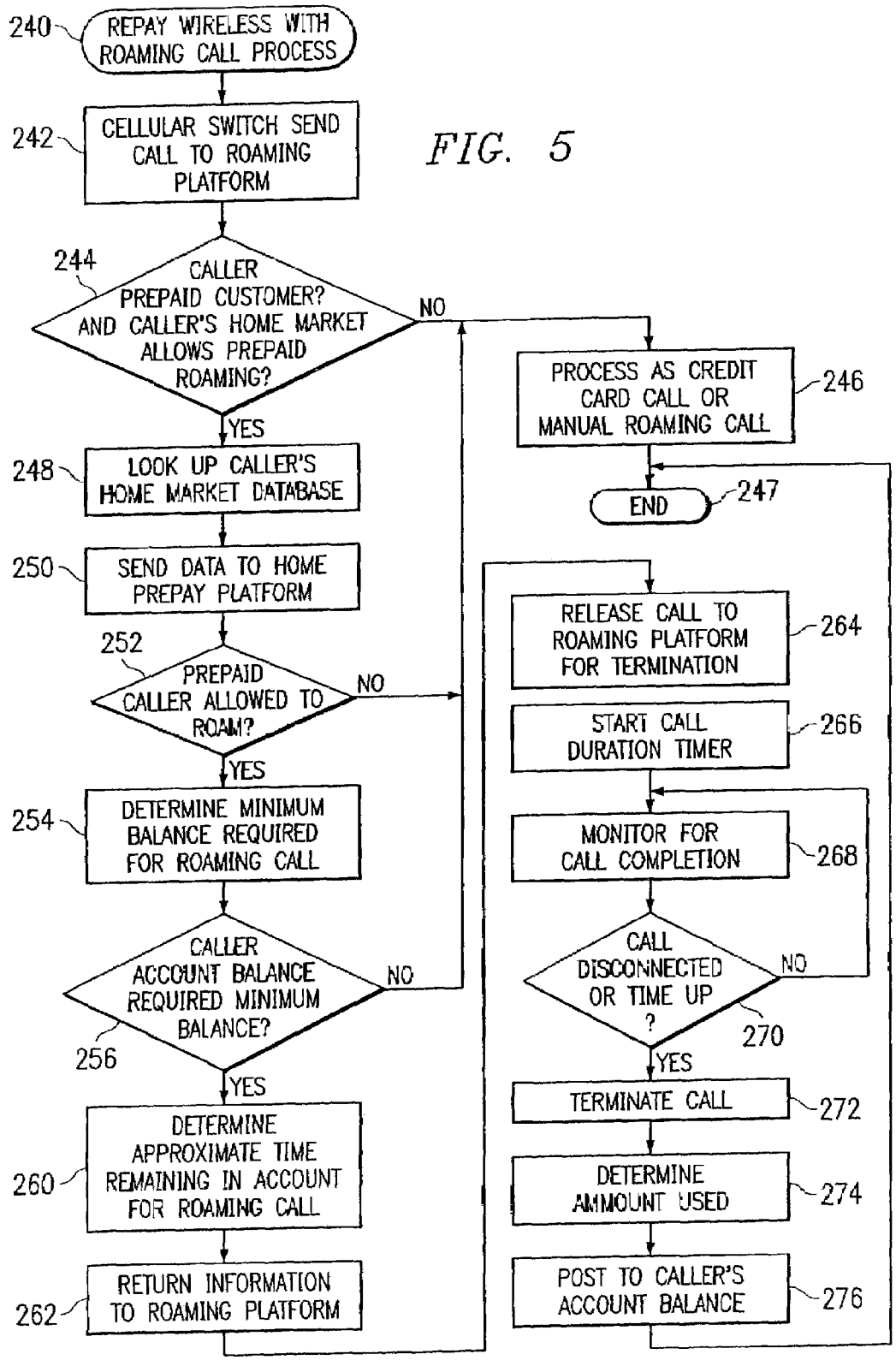
FIG. 5 is a flowchart of an exemplary prepay wireless call processing with roaming according to the teachings of the present invention.

FIG. 5 is a flowchart of an exemplary prepay wireless call processing with roaming 240 according to the teachings of the present invention. Cellular switch 24 transfers the call to a manual or credit card roaming platform 96 after it recognizes the call as unauthorized to roam, as shown in block 242. Roaming platform 96 may be a platform that is on-site with a cellular switch 24, such as an American Roaming Network offered by National Telemanagement Corporation of Dallas, Tex. Roaming platform 96 then performs a database lookup to determine if the NPA-NXX of the caller's MIN is an authorized home carrier prepay area code exchange. Additionally, roaming platform 96 determines whether the roam market or carrier (the wireless carrier serving the caller) allows prepay roaming with the caller's home market or carrier, as shown in block 244. If either condition is not met, then the call is processed as a credit card call or a manual roaming call, as shown in block 246.

If both conditions in block 244 are satisfied, then roaming platform 96 looks up the caller's home market and transfers the call thereto, as shown in block 248. In addition, as shown in block 250, roaming platform 96 sends certain data to the caller's home prepay wireless platform 50, such as the area or location the request for service, originates from, and what type of service is requested and the rate for that type of service if the rate is determined by the roam carrier. Typically, the roam carrier dictates both the scope of the local calling area and the long distance rates applicable to calls terminating outside of the local calling area. The caller's home market dictates the access and air time fees charged to the caller while making calls within the roam market.

Once the call is transferred to home prepay wireless platform 50, call processor 106 performs further database lookups to make several determinations. In block 252, call processor 106 determines whether prepay call is allowed to roam. The option to roam in other markets may be flagged in multiple locations, such as a system-wide flag which indicates whether roaming is permitted for any subscriber to that prepay wireless platform 50, and an individual subscriber may be flagged to indicate whether roaming is permitted for that particular subscriber. If either flag indicates that the caller is not allowed to roam, then the call is processed as a credit card or manual roaming call in block 246. If the caller is allowed to roam, then the minimum balance required for the roaming call is computed, as shown in block 254. If the account balance of the caller is not equal to or greater than the minimum balance, the caller cannot roam on the prepay account, and the call is processed as a credit card or manual roaming call in block 246. If there is sufficient funds in the caller's account, then the amount of time available for the roaming call is computed or the maximum allowable call duration, as shown in block 260. This value may be determined by first consulting an established rate table for the roam market and maintained at prepay wireless platform 50. The rate table (not shown) may include information such as the roaming charges delineated by time of day, by call, and/or minutes of use. The call roaming minute rate is thus determined. Further, calling restrictions, if any, are looked up in database 116 and adhered to. The computation for the amount of time available for the call also takes into account any long distance charges and applicable taxes.

Home prepay wireless platform 50 then returns the computed maximum allowable call duration value and any calling restrictions to roaming platform 96, and also releases the call back to the roaming platform's switch for termination, as shown in block 264. A prepay wireless platform co-located with roaming platform 96 then starts a call duration timer and monitors for call termination in blocks 266 and 268. If the call is disconnected at either the originating or terminating equipment or the call duration timer reaches the predetermined maximum allowable call duration received from home prepay wireless platform 50, as determined in block 270, then the call is disconnected in block 272. The amount used up by the call is computed and immediately posted to the caller's account balance stored, at home prepay wireless platform 50 to reflect a lower amount, as shown in block 274 and 276. The process then terminates in block 247.

Constructed and operating in this manner, live call management, is possible to protect wireless carriers, from fraud and calls made on, depleted accounts. Further, complete records of all activation and replenishment transactions and details of each call are, available to the prepay, wireless service administration and the cellular carriers, unlike systems which route, prepay calls to remote switches for processing. Prepay wireless customers may activate or replenish their accounts at a comprehensive network of easily accessible locations, which relays the transaction amounts to the account balance databases, in real-time. No cumbersome access codes, PINs, and debit cards are required to use the, pre pay wireless service of the present invention.

Although several embodiments of the present invention and its advantages have been described in detail, it should be understood that a myriad of mutations, changes, substitutions, transformations, modifications, variations, and alterations can be made therein without departing from the teachings of the present invention, the spirit and scope of the invention being set forth by the appended claims.

What is claimed is:

1. A method for managing a prepay wireless call, comprising:
    at a roaming platform:
        transferring a wireless call, received from a cellular switch, to a home prepay call management platform;
    at the home prepay call management platform:
        receiving the wireless call from the roaming platform;
        determining a prepay account balance associated with the wireless call;
        computing a maximum allowable call duration based on the prepay account balance;
        sending the maximum allowable call duration to the roaming platform;
        releasing the wireless call back to the roaming platform;
    at a roaming prepay call management platform co-located with the roaming platform:
        starting a call duration timer; and
        if the call duration timer reaches the maximum allowable call duration, disconnecting the call.

2. The method of claim 1, further comprising:
    at the roaming platform:
        determining whether the wireless call is authorized; and
        if the wireless call is not authorized, processing the call as at least one of a credit card call and a manual roaming call.

3. The method of claim 2, wherein said determining whether the wireless call is authorized includes:
    determining whether a customer group office code of a mobile identification number associated with the wireless call is an authorized prepay area code exchange of a home carrier; and
    determining whether the cellular switch allows prepay roaming with the home carrier.

4. The method of claim 1, further comprising:
    at the roaming platform:
        sending, to the home prepay call management platform, a wireless call origination area, a wireless call service type, and a wireless call roaming rate.

5. The method of claim 4, wherein the wireless call roaming rate includes at least one of a local rate and a long distance rate.

6. The method of claim 1, further comprising:
    at the home prepay call management platform:
        determining whether the wireless call is allowed to roam; and
        if the wireless call is not allowed to roam, processing the call as at least one of a credit card call and a manual roaming call.

7. The method of claim 1, further comprising:
    at the home prepay call management platform:
        computing a minimum balance;
        comparing the prepay account balance to the minimum balance;
        if the prepay account balance is less than the minimum balance, processing the call as at least one of a credit card call and a manual roaming call.

8. The method of claim 1, further comprising:
    at the home prepay call management platform:
        sending wireless call restrictions to the roaming platform.

9. The method of claim 1, wherein said determining a prepay account balance includes:
   sending, to a customer database server, a request to lookup the prepay account balance; and
   receiving, from the customer database server, the prepay account balance.

10. The method of claim 9, further comprising:
    computing an amount of funds expended by the wireless call; and
    sending, to the customer database server, the amount of funds expended from the prepay account balance.

11. The method of claim 10, further comprising:
    at the customer database server:
       posting the amount of funds expended from the prepay account balance.

12. The method of claim 11, further comprising:
    at the customer database server:
       receiving a prepayment amount associated with a prepay account; and
       posting the prepayment amount to the prepay account.

13. The method of claim 1, wherein said computing a maximum allowable call duration includes:
    determining a rate per minute; and
    computing the maximum allowable call duration, in minutes, based on the prepay account balance and the rate per minute.

14. The method of claim 13, wherein said rate per minute is based on at least one of a wireless call roaming rate, an access rate, and an air time rate.

15. The method of claim 1, further comprising:
    if the maximum allowable call duration is not greater than zero, disconnecting the call.

16. The method of claim 1, further comprising:
    at the roaming prepay call management platform:
       monitoring the call for an indication of call completion; and
       if call completion is indicated, disconnecting the call.

17. A system for managing a prepay wireless call, comprising:
    a roaming platform, coupled to a cellular switch, to:
       transfer a wireless call received from a cellular switch;
    a home prepay call management platform, coupled to the roaming platform, to:
       receive the wireless call from the roaming platform;
       determine a prepay account balance associated with the wireless call;
       compute a maximum allowable call duration based on the prepay account balance;
       send the maximum allowable call duration to the roaming platform;
       release the wireless call back to the roaming platform;
    a roaming prepay call management platform, coupled to the roaming platform, to:
       start a call duration timer; and
       if the call duration timer reaches the maximum allowable call duration, disconnect the call.

18. The system of claim 17, wherein the roaming platform is further adapted to:
    determine whether the wireless call is authorized; and
    if the wireless call is not authorized, process the call as at least one of a credit card call and a manual roaming call.

19. The system of claim 18, wherein to determine whether the wireless call is authorized includes to:
    determine whether a customer group office code of a mobile identification number associated with the wireless call is an authorized prepay area code exchange of a home carrier; and
    determine whether the cellular switch allows prepay roaming with the home carrier.

20. The system of claim 17, wherein the roaming platform is further adapted to:
    send, to the home prepay call management platform, a wireless call origination area, a wireless call service type, and a wireless call roaming rate.

21. The system of claim 20, wherein the wireless call roaming rate includes at least one of a local rate and a long distance rate.

22. The system of claim 17, wherein the home prepay call management platform is further adapted to:
    determine whether the wireless call is allowed to roam; and
    if the wireless call is not allowed to roam, process the call as at least one of a credit card call and a manual roaming call.

23. The system of claim 17, wherein the home prepay call management platform is further adapted to:
    compute a minimum balance;
    compare the prepay account balance to the minimum balance;
    if the prepay account balance is less than the minimum balance, process the call as at least one of a credit card call and a manual roaming call.

24. The system of claim 17, wherein the home prepay call management platform is further adapted to:
    send wireless call restrictions to the roaming platform.

25. The system of claim 17, further comprising:
    a customer database server, coupled to the home prepay call management platform, to store prepay account information.

26. The system of claim 25, wherein to determine a prepay account balance includes to:
    send, to the customer database server, a request to lookup the prepay account balance; and
    receive, from the customer database server, the prepay account balance.

27. The system of claim 26, wherein the home prepay call management platform is further adapted to:
    compute an amount of funds expended by the wireless call; and
    send, to the customer database server, the amount of funds expended from the prepay account balance.

28. The system of claim 27, wherein the customer database server is further adapted to:
    posting the amount of funds expended from the prepay account balance.

29. The system of claim 28, wherein the customer database server is further adapted to:
    receive a prepayment amount associated with a prepay account; and
    post the prepayment amount to the prepay account.

30. The system of claim 17, wherein to compute a maximum allowable call duration includes to:
    determine a rate per minute; and
    compute the maximum allowable call duration, in minutes, based on the prepay account balance and the rate per minute.

31. The system of claim 30, wherein said rate per minute is based on at least one of a wireless call roaming rate, an access rate, and an air time rate.

32. The system of claim 17, wherein the home prepay call management platform is further adapted to:
    disconnect the call if the maximum allowable call duration is not greater than zero.

33. The system of claim 17, wherein the roaming prepay call management platform is further adapted to:
    monitor the call for an indication of call completion; and
    if call completion is indicated, disconnect the call.

* * * * *